UNITED STATES PATENT OFFICE.

JAMES W. CALTA, OF PLATTE, SOUTH DAKOTA.

COMPOSITION OF MATTER FOR SEALING PISTON-RINGS.

1,363,563. Specification of Letters Patent. Patented Dec. 28, 1920.

No Drawing. Application filed October 23, 1918. Serial No. 259,410.

*To all whom it may concern:*

Be it known that I, JAMES W. CALTA, a citizen of the United States, residing at Platte, county of Charles Mix, and State of South Dakota, have invented certain new and useful Improvements in Composition of Matter for Sealing Piston-Rings, of which the following is a specification.

My invention relates to composition of matter, and more particularly to a paste for sealing piston rings in cylinders, and it consists in the ingredients hereinafter named.

An object of my invention is to provide a composition of matter for sealing piston rings so as to prevent oil, gas, etc., from passing the ring.

A further object of my invention is to provide a composition of the type described which will stand the high temperature of an internal combustion engine without deteriorating.

A further object of my invention is to provide a composition which is, in itself, a lubricant.

Other objects and advantages will appear in the following specification, and the novel features of the invention will be particularly pointed out in the appended claims.

In carrying out my invention, I make use of pulverized, or powdered, soapstone, pulverized or powdered mica, asbestos fiber which may be disintegrated asbestos wicking or pure shredded asbestos, flake graphite, and fine plumbago.

In preparing the composition, I use preferably thirty per cent. of soapstone, thirty per cent. of mica, twenty per cent. of asbestos fiber, ten per cent. of flake graphite, and ten per cent. fine plumbago. With the above mentioned ingredients I mix sufficient hard oil (mineral oil) to form a paste.

The composition made as described is applied to the piston between the piston rings, and it may also be applied to the piston rings themselves. When the engine is running, the paste will work into the groove of the piston rings so that any expansion of the latter will be compensated for by the paste, thereby keeping the piston rings tight against the walls of the cylinder. The use of this compound effectually seals the piston and leads to a number of advantages. It prevents the oil from working up past the piston into the explosion chamber, and therefore decreases the carbon in the explosion chamber which results largely from the burning of the oil. It prevents disagreeable fumes because of the fact that the oil is not burned. It prevents any leakage of the gas past the piston and hence maintains the compression at a maximum. Being of itself a lubricant, it acts as an auxiliary means for maintaining the smooth working of the piston and decreasing the heat of friction. This makes a cooler engine, and, as a consequence, less water is required for the radiator. Owing to the fact that the composition does not burn out at the temperature of the internal combustion engine, it will last for a long time without renewal. A further feature is that the use of the composition saves gasolene, for it not only reduces the friction, and therefore permits a given amount of gasolene to do a greater amount of work, but in preventing the loss of gas past the piston, power is saved and hence a given amount of gasolene will drive the engine a longer time.

It is impossible to machine the outer surface of piston rings, or the inner surface of a cylinder, to absolute smoothness. The composition, when used in connection with the piston, tends to fill up the pores of the piston or cylinder, or any imperfections therein, so that these surfaces become virtually smooth surfaces such as one finds only in the finest grade of machine work, without, however, necessitating the expense which such fine work always entails.

I claim:

1. The herein described composition of matter for sealing piston rings, which consists of a refractory lubricating paste, comprising a mixture of soapstone, mica, asbestos fiber, flake graphite, fine plumbago and mineral oil.

2. The herein described composition of matter for sealing piston rings, which consists of a refractory lubricating paste, comprising a mixture of soapstone, mica, asbestos fiber, flake graphite, fine plumbago and mineral oil in the following proportions, to wit: thirty per cent. soapstone, thirty per cent. mica, twenty per cent. asbestos fiber, ten per cent. flake graphite, ten per cent. fine plumbago, and mineral oil sufficient to make the paste.

JAMES W. CALTA.